March 20, 1951 W. C. BRUBAKER 2,545,601
DIFFERENTIAL MECHANISM
Filed Oct. 10, 1946 2 Sheets—Sheet 1

INVENTOR.
William C. Brubaker

March 20, 1951 W. C. BRUBAKER 2,545,601
DIFFERENTIAL MECHANISM
Filed Oct. 10, 1946 2 Sheets-Sheet 2

INVENTOR.
William C. Brubaker,
BY
Ira J. Wilson
Atty.

Patented Mar. 20, 1951

2,545,601

UNITED STATES PATENT OFFICE 2,545,601

DIFFERENTIAL MECHANISM

William C. Brubaker, Chicago, Ill.

Application October 10, 1946, Serial No. 702,490

3 Claims. (Cl. 74—711)

This invention relates generally to differential mechanisms of the type for delivering torque to a pair of alined driven members, and has particular reference to improvements therein whereby the torque is correctly proportioned between the driven members during certain conditions of operation, and whereby a locking effect is brought into operation when there is a tendency of one of the driven members to dissipate the torque applied thereto.

As is known to those skilled in the art, the conventional differential mechanisms, such as are found in the present-day automobile, apply uniform torque to the driving wheels whether the vehicle is operating in a straightaway direction or where it is rounding a curve, but only when, under either condition of travel, there is tractive resistance to both wheels. Where there is little or no such tractive resistance on either wheel all the driving torque is dissipated through the freely spinning wheel and no torque is delivered to the wheel having tractive resistance.

Many efforts have been made to cure the inability of a differential mechanism to operate on surfaces offering little tractive resistance. These have generally taken the form of a pair of overrunning clutches driven from a common driving point, and so arranged that the driven wheels took the entire torque in the straightaway direction only when the tractive resistance to each wheel was substantially equal. In the event one of the wheels offered no tractive resistance, the driving torque was entirely transferred to the other wheel, and consequently when traction was needed the greatest, only one of the wheels supplied such traction. In such devices there was required the use of pawls, ratchets, springs, or sliding contacts in order to accomplish the locking for the straightaway driving, and these were not generally suitable, since they readily wore out and became noisy.

Such devices were also open to the objection that in turning only one of the wheels received the full tractive torque, and then only the inner wheel, the one least favorably situated for driving. In turning, the outer wheel, which had the longer arc of travel, merely overran the clutch, and had no torque exerted upon it.

With the foregoing considerations in mind, it is a principal object of this invention to provide a differential mechanism of simplified and rugged construction which will distribute and deliver the torque in proper proportions and which will eliminate the possibility of dissipating the torque through a spinning member or wheel.

Still another object is to provide a differential mechanism giving proper torque distribution under all operating conditions, and characterized by the absence of ratchets, pawls or springs, for accomplishing proper torque distribution.

A still further object is to provide in a differential mechanism an axially movable member which serves as a driving connection between the differential gear and the driven shaft and also as a means for locking the differential gear under conditions of no tractive resistance and for transmitting a controlled degree of torque to the driven shaft when the driven member tends to overrun.

A still further object is to provide in a differential mechanism a pair of axially movable members which furnish a driving connection for a pair of driven members or shafts with a pair of differential members or gears, the axially movable members being movable to prevent any differential motion during periods when no tractive load is upon one or the other of the driven members, the axially movable members moving also to compensate for the overrunning of either of the driven members, so that proper proportioning of the torque is given to the member tending to overrun.

Another purpose is to provide means for locking axially movable members to a spider pinion support or to a central spider, which will then lock the differential gears for equal torque transfer to both wheels regardless of the tractive resistance to each.

Further objects are to provide a construction of maximum simplicity, efficiency, economy and ease of assembly and operation, and such further objects, advantages and capabilities as will later more fully appear and are inherently possessed thereby.

Figure 1:
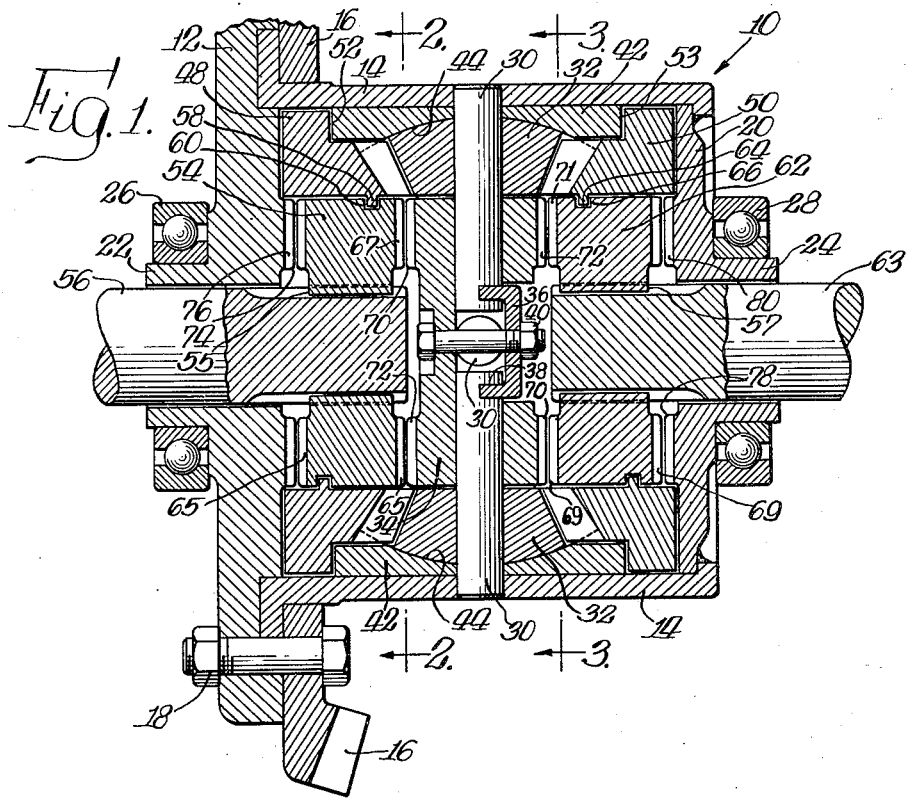
Fig. 1 is a longitudinal section taken through a mechanism embodying my invention.
Figure 2:
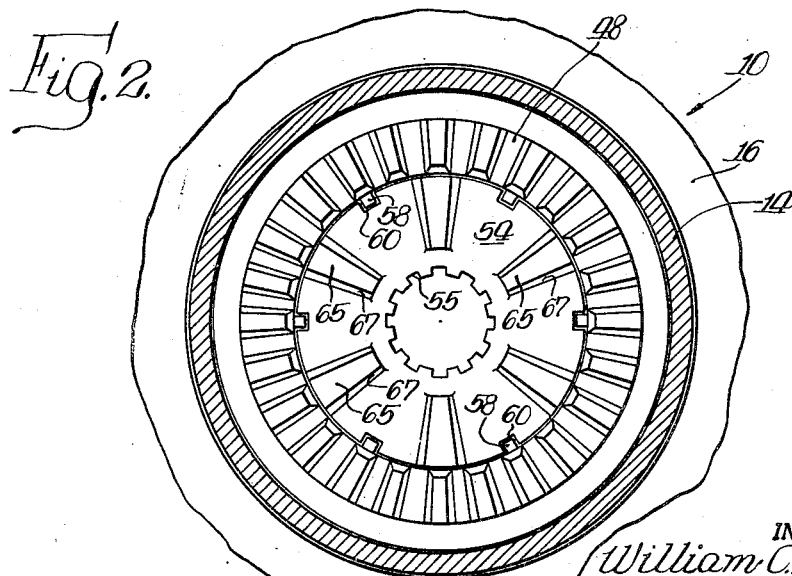
Fig. 2 is a transverse section taken substantially on the lines 2—2 of Fig. 1, showing one of the differential gears and one of the clutch rings in elevation.

Referring now to the drawings, Fig. 1 shows a differential mechanism indicated generally by the ordinal 10, comprising a circular disc or plate 12 upon which a cylindrical spider carrier 14 and a driving bevel ring gear 16 are mounted by means of a plurality of bolts and nuts 18. The free end of the spider carrier 14 is closed by a circular closure plate 20 welded or otherwise secured to the carrier. The plates 12 and 20 are shaped to provide hubs 22 and 24, respectively, which are supported in bearings 26 and 28, mounted in a differential housing (not shown) of conventional form. Rotation is imparted to the plate 12 and attached parts by a driving pinion (not shown) meshing with the ring gear 16.

A plurality of posts or pintles 30 are radially disposed in spaced apart relation within the carrier 14. Bevel pinions 32 are freely rotatable upon these posts. The outer ends of these posts are mounted in the walls of the carrier while the inner ends thereof are supported in a center spider 34. The posts are secured against axial displacement by a cupped retainer 36, the flange of which engages grooves 38 in the posts. The retainer is anchored by a nut and bolt 40 passing through the center spider 34.

The posts 30 also retain against displacement a separating ring 42 concavely recessed as at 44 in conformity with the convex faces of the spider pinions 32 and adapted to receive the outward thrust of the pinions 32. Any inward thrust of these pinions is received by the flat surfaces 46 of the center spider 34.

Figure 4:
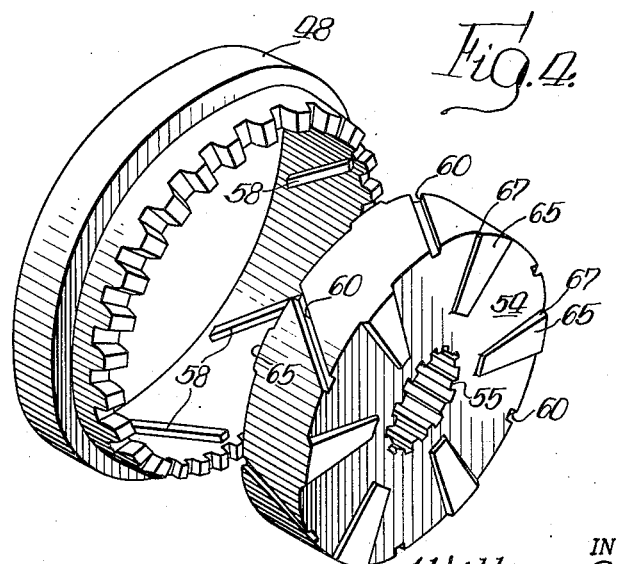
Fig. 4 is an isometric view showing one of the differential gears and one of the clutch rings in separated position.

The spider bevel pinions 32 mesh with a pair of crown or ring differential gears 48 and 50. The gear 48 is retained in position by the end plate 12 and a shoulder 52 on the separating ring 42 while the gear 50 is similarly retained by the plate 20 and a shoulder 53. The differential or ring gear 48 has a driving connection with a clutch ring 54 splined at 55 to a driven member or shaft 56. Said driving connection comprises a plurality of helical ribs or lands 58 on the interior of the gear 48 engaged in companion grooves 60 on the perimeter of the clutch ring 54. Similarly, the differential or ring gear 50 has a driving connection with a clutch ring 62, splined at 57 to a driven member or shaft 63. This driving connection also comprises a plurality of helical ribs or lands 64 on the interior of the gear 50, engaged in companion grooves 66 on the perimeter of the clutch ring 62. The construction of gear 48 and clutch ring 54 shown in Fig. 4 is duplicated in reverse in gear 50 and clutch ring 62. The sizes and number of splines connecting the gears and clutch rings may vary to suit requirements as may also the angle of the spline helix with respect to the axis of rotation of gears and rings, although an angle of 45°, as shown, appears to be preferable. It will be apparent that upon relative rotation of ring gear 48 or 50, with respect to its companion clutch ring 54 or 62 such clutch ring will be moved by the inclined spline connections axially of its companion gear with a screwing motion.

The mechanism thus far described is substantially a conventional differential mechanism common in road vehicles, excepting that the differential gears 48 and 50 instead of being directly connected to the driven shafts 56 and 63 in a conventional manner, are connected thereto through the intermediary of the clutch rings 54 and 62.

Figure 3:
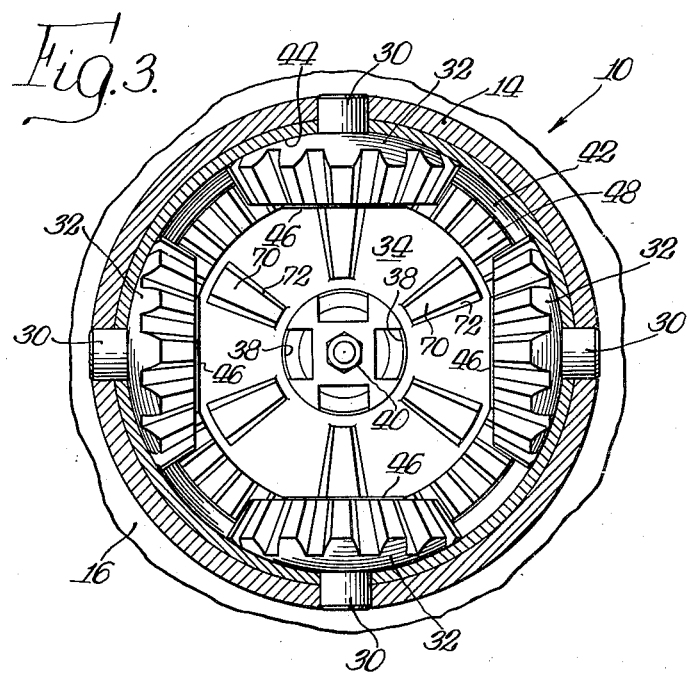
Fig. 3 is a transverse section taken substantially along the lines 3—3 of Fig. 1, showing the differential spider pinions, the central spider, and portions of the pintles supporting the differential spider pinions in elevation.

In conjunction with the construction thus far described my invention contemplates the provision of means to properly proportion the torque delivered to the driven shafts 56 and 63 when either of said shafts tends to overrun the other, and to lock the differential mechanism if there is a slight or no restraining resistance to rotation of either of the shafts 56 and 63. To this end there is provided on both faces of the clutch ring 54 a number of clutch dogs 65, six in number on each face as shown in Fig. 4. Each clutch dog 65 is about 20° in width and the dogs are spaced equally about 60° apart, and have flank faces 67 disposed at an angle of 45° with the face plane of the clutch ring. The central spider 34 (Fig. 3) is similarly provided with dogs 70 of the same configuration as the dogs 65 and spaced in the same manner. These dogs 70 have similarly inclined flank faces 72, so that when the clutch ring 54 is in contact with central spider 34, the flank faces 67 and 72 will be in abutting relation. The clutch ring 62 is provided on both its plane faces with similar dogs 69 having inclined flank faces 71, so that when the clutch ring 62 is in contact with the spider 34 the flank faces 71 and 72 will be in abutting relation, as will appear later.

The inner face of end plate 12 is provided also with similar dogs 74 having inclined flank faces 76, the dogs 74 being spaced apart similarly to the dogs 65 and the inner face of end plate 20 is likewise provided with dogs 78 having inclined flank faces 80, these dogs being also spaced apart like the dogs 65.

The operation of the device described above is as follows:

Assume that the differential mechanism 10 is incorporated in a road vehicle and that power is being transmitted through the mechanism to the driven shafts 56 and 63, and the vehicle is traveling in a straight line with approximately equal tractive resistance on each wheel and shafts 56 and 63. The spider support 14 will be rotated by the bevel drive gear 16 and the spider pinions 32 not rotating under these conditions on their posts 30 will carry the ring gears 48 and 50 around with the spider support 14. Through their respective clutch rings 54 and 62 these gears will impart rotation to the shafts 56 and 63 in the same direction and at the same speed. Under this condition of operation it is immaterial what axial position the clutch rings 54 and 62 and their dogs 65 and 69 take with relation to the dogs 74 and 78 on the end plates 12 and 20 and to the dogs 70 on the center spider, since the end plates, the center spider, the clutch rings, and the ring gears are all rotating as a unit without movement relatively to each other. Theoretically, however, in forward driving, the clutch rings 54 and 62 would be moved by the spline connections toward the center spider 34 so as to bring the dogs 65 and 69 into abutting relation with the spider dogs 70.

When there is very slight tractive resistance or none at all to the rotation of one of the driven shafts 56 or 63, for example shaft 63, the spider pinions 32 will rotate upon their pintles 30, since the shaft 56 will be immobilized, and the differential gear 50 will rotate at twice the speed of the spider 34. Rotation of the differential gear 50 acting through the splines 64, moves the clutch ring 62 axially with respect to the gear 50 until the flank face 71 of the dog 69 on clutch ring 62 is in contact with the flank face 72 of dog 70 on the center spider 34. At such time the shaft 63 will, of course, continue to rotate. However, if dogs 65 of the clutch ring 54 should make contact with dogs 70 on center spider 34 before contact of the dogs 69, the dogs 70 at their faces 72 on the spider 34 will thrust to one side the clutch ring 54, since sliding will take place on the face 67 of the dog 65 of clutch ring 54. This is possible since any axial force on the clutch ring 54 will merely, through the spline 58, rotate the differential gear 48 on the spider pinions 32.

A component of the rotative force, produced by the helical spline 64 connecting the differential gear 50 to the clutch ring 62, acts normally to the flank faces 71 and 72 of the interlocked dogs 69 and 70, and hence the clutch ring 62 and the central spider 34 rotate together, locking the differential gear to the spider pinions 32 which then cannot rotate. The differential gear 48 also cannot rotate independently of gear 50 and the clutch ring 54 then drives the shaft 56, and shaft 63 is driven by clutch ring 62 at the same rate.

Obviously, where the shaft 56 has no tractive resistance, the operation above would also take place with respect to differential gear 48 and clutch ring 54 and the shaft 63 would have no differential action, and would be locked as was shaft 56.

In the case where a vehicle is operating on a curve, it is necessary for the outer wheel to travel a longer arc than the inner wheel. In conventional locking differential mechanisms this merely results in the outer wheel having a free-wheeling connection with the differential. In the mechanism according to the present invention the outer wheel receives part of the driving torque on the drive bevel gear 16, and the entire driving torque is correctly proportioned between both shafts 56 and 63.

Consider the case where the shaft 63 must rotate at a greater speed than the shaft 56, as in a vehicle rounding a curve. As has been explained, in travel on a straight line, the dogs 65 and 69 are normally in engagement with the dogs 70 of the center spider 34. As the shaft 63 begins to rotate at a greater speed than shaft 56, the tractive resistance thereon will set up a force that lies in the plane of the contiguous faces of the center spider 34 and the clutch rings 62. A component of this force, set up by the angularity of the contacting flank faces 71 and 72 will cause the dogs 69 and 70 to slide out of contact as the right clutch ring 62 moves axially on the spline of shaft 63. During this action the differential gear 50 continues to act on the clutch ring 62 to drive the shaft 63.

The continued torque applied by pinions 32 through ring gear 50 and through the inclined splines moves the clutch ring 62 to the left (Fig. 1), causing the dogs 69 to engage the dogs 70 of the center spider 34. Once more the component of force against the flank faces 71 and 72, induced by the tractive resistance upon shaft 63, causes the clutch ring 62 to be moved to the right on the spline of shaft 63, all the while being acted upon by the differential gear 50 to drive the shaft 63.

The above action continues as long as the shaft 63 rotates at a greater speed than shaft 56, and it will be seen that torque is constantly applied thereto. It will be readily apparent that if the shaft 56 is the one rotating at the greater speed similar actions by the differential gear 48 and the clutch ring 54 take place.

From the foregoing description it will be apparent that the differential mechanism according to the present invention presents many advantages not found in devices at present in use. The mechanism described hereinabove gives positive locking of both driven members upon absence of tractive or torque resistance to either of the driven members, so that the driving torque is not dissipated through the member offering no tractive or torque resistance, and so that torque is delivered to the member offering torque or tractive resistance.

The mechanism according to the present invention also gives proper proportioning of the driving torque to a driven member which tends to overrun another driven member, as in the driving axle shafts of a road vehicle, and insures that the faster rotating member also receives driving torque.

It will also be apparent that the device is operative should one of the driven members break for any reason, the entire driving torque being transferred to the other driving member.

While the invention has been described in terms of a preferred embodiment thereof, its scope is not to be limited only in terms of the embodiment shown, nor otherwise than by the terms of the claims here appended.

I claim:

1. In a differential mechanism including a ring gear and a ring gear carrier for driving a pair of aligned driven members, a spider pinion carrier connected with said ring gear carrier for movements therewith, a plurality of spider pinions carried by said spider pinion carrier, a pair of differential gears in meshing engagement with said spider pinions, a pair of clutch rings interiorly splined to said driven members and movable axially with respect thereto, spaced clutch dogs provided on the opposite faces of said clutch rings, spaced clutch dogs at the opposite sides of the ring gear carrier and spider pinion carrier adapted to be engaged by the clutch dogs of one of said clutch rings depending upon the direction of relative rotation of one differential gear with respect to the other whereby to provide a reversible driving connection between said differential gears and said driven members, and a helical spline connection between the clutch rings and differential gears comprising helical ribs disposed in spaced relation about the interior of the differential gears, and complementary helical grooves spaced over the perimeter of the clutch rings for receiving the helical ribs and move one or the other of the clutch rings axially into clutching engagement.

2. In a differential mechanism for driving a pair of aligned shafts and proportioning the torque delivered to said alined shafts, a spider carrier supporting a driving member, a spider supported in said carrier and rotatable therewith, a plurality of spider pinions supported by said spider, differential gears in meshing engagement with said spider pinions, clutch rings encompassed by said gears and each having a spline connection with a shaft and axially movable with respect thereto upon relative rotation of said gears and said rings, said gears and clutch rings having adjacent cylindrical surfaces provided with spaced helical ribs and complementary helical grooves for moving the clutch rings axially with respect to the gears upon relative rotation therebetween, and raised dogs on the opposite plane surfaces of said rings and said spider, said dogs having flank faces at an angle to the plane surfaces, whereby upon overrunning of one of said shafts the dogs of the spider and one of said clutch rings are in engagement to lock one of said gears to the spider pinions.

3. In a differential mechanism for driving a pair of alined shafts, a drive member, a spider carrier supporting said drive member, a central spider supported in said carrier and rotatable therewith, a plurality of spider pinions supported by said central spider, differential gears in meshing engagement with said pinions, a pair of clutch rings each encompassed by a differential gear and splined to and movable axially on one of said shafts, and a driving connection between each differential gear and its clutch ring and comprising spaced helical ribs and complementary helical grooves on the adjacent cylindrical surfaces of the differential gear and its clutch ring, each of said clutch rings when rotated relatively to its differential gear moves axially toward said central spider, and similarly arranged interengageable dogs on the spider carrier, the central spider and the opposite faces of the clutch rings for locking the differential gears when one of said shafts offers substantially no resistance to the torque applied thereto.

WILLIAM C. BRUBAKER.

REFERENCES CITED

The following references are of record in the file of this patent:

UNITED STATES PATENTS

| Number | Name | Date |
| --- | --- | --- |
| 1,361,895 | Nogrady | Dec. 14, 1920 |
| 1,529,804 | Nogrady | Mar. 17, 1925 |
| 1,556,101 | Goodhart | Oct. 6, 1925 |
| 1,938,649 | Welsh | Dec. 12, 1933 |
| 2,424,942 | Mynssen | July 29, 1947 |